Patented July 6, 1954

2,683,082

UNITED STATES PATENT OFFICE 2,683,082

N-ARYL - N'-(p - HYDROXYPHENYL) UREAS AS ANTIOXIDANTS FOR PETROLEUM HYDROCARBON FUELS

Eugene F. Hill, Birmingham, and David O. De Pree, Royal Oak, Mich., assignors to Ethyl Corporation, New York, N. Y., a corporation of Delaware No Drawing. Original application December 9, 1950, Serial No. 200,111. Divided and this application January 26, 1952, Serial No. 268,455

3 Claims. (Cl. 44—71)

This application is a division of co-pending application, Serial Number 200,111, filed December 9, 1950, now abandoned, which co-pending application was in part a continuation of Serial Number 135,043, filed December 24, 1949, now abandoned.

This invention relates to new urea derivatives. More particularly our invention relates to N-aryl-N'-hydroxyphenyl ureas.

The substance N-p-hydroxyphenyl urea, has been described heretofore. This material possesses no utility in the field of oxidation inhibition. We have discovered, however, that by substituting the free amine of N-p-hydroxyphenyl urea with an aryl group we obtain a class of substances which are powerful gasoline antioxidants. So far as we are aware it has not previously been known that the mere addition of hydrocarbon groups to an otherwise inactive compound would produce thereby a material which would prevent deterioration of petroleum hydrocarbons by the action of oxygen.

Therefore it is an object of our invention to provide a new class of antioxidant materials useful in protecting petroleum hydrocarbons from deterioration in the presence of oxygen or air. In particular it is an object of our invention to provide a new class of materials which prevents the deterioration of motor fuels by oxygen.

In accordance with our invention we provide new ureas which contain the basic structure

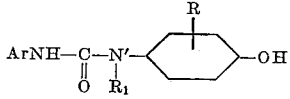

wherein an hydroxyphenyl radical is linked to the N'-nitrogen atom, a hydrocarbon aryl group is linked to the other, and the groups designated as R and R₁ are hydrogen or hydrocarbon radicals.

The above objects of our invention can be achieved by introducing hydrocarbon groups in the structure presented above. Examples of hydrocarbon groups which we can employ include alkyl or aralkyl, aryl or alkaryl and alkenyl. Typical alkyl or aralkyl groups which we employ include methyl, ethyl, propyl, n-butyl, sec.-butyl, isobutyl, octyl, dodecyl, cyclobutyl, cyclohexyl, benzyl, or phenylethyl. Typical aryl or alkaryl groups of our invention include phenyl, o-tolyl, m-tolyl, p-tolyl, the xylyls, and o-phenylene, as for example when Ar is α-naphthyl, or β-naphthyl. Illustrative of the alkenyl groups which we can employ are allyl, propenyl, butenyl, crotyl, methallyl, phytyl, isobutenyl, oleyl, or cyclohexenyl.

The free amine from which our compounds can be considered as being derived, in addition to being inactive as an antioxidant, possesses a low degree of solubility in petroleum hydrocarbons. However, by substituting an aryl group on the free amine nitrogen, in accordance with our invention, we not only increase the solubility in petroleum hydrocarbons but obtain the unexpected result that we thereby create an antioxidant material which is as potent as many commercial antioxidants and more potent than several.

In general the compounds of our invention are prepared readily and in good yield by combining arylisocyanates with p-aminophenols. In the examples which follow we illustrate the preparation of specific examples of the novel compounds of our invention and in these examples all parts and percentages are by weight.

EXAMPLE I

*N-(p-tolyl)-N'-(p-hydroxyphenyl) urea.*—To a vessel provided with an agitator, means for returning reflux to the reaction vessel, means for introducing liquid reactants, and means for supplying heat was added 100 parts of p-aminophenol and 300 parts of toluene. This mixture was heated to a temperature of 50° C. and 120 parts of p-tolylisocyanate was added over a period of one and one-quarter hours. At the end of the addition the mixture was heated for an additional period of 30 minutes. The reaction mixture containing the product as a suspended solid was filtered and the N-(p-tolyl)-N'-(p-hydroxyphenyl) urea was recovered in 97 per cent yield based upon the p-aminophenol employed. This product melted at a temperature of 214 to 216° C.

EXAMPLE II

*N-phenyl-N' (2-pentadecyl-4- hydroxyphenyl)-urea.*—In accordance with the procedure of Example I, 2-pentadecyl-4-hydroxyaniline in toluene was treated with phenylisocyanate to produce N-phenyl-N'(2-pentadecyl-4-hydroxyphenyl) urea.

When we treated α-naphthylisocyanate and β- naphthylisocyanate with p-aminophenol according to the procedure of Example I, we obtained N-α-naphthyl-N'-p-hydroxyphenyl urea and N-β-naphthyl - N'(p - hydroxyphenyl)urea, respectively.

When we treat o-tolylisocyanate and 3-(mixed)-amylphenylisocyanate with p-aminophenol according to the process described in Example I, we obtain N-o-tolyl-N'-(p-hydroxyphenyl)urea, and N-(m-(mixed) amylphenyl)-N'-(p-hydroxyphenyl) urea, respectively.

EXAMPLE III

*N-phenyl-N'-methyl-N'-(p - hydroxyphenyl)-urea.*—In accordance with the procedure of Example I, N-methyl-p-aminophenol in benzene was treated with phenylisocyanate. The product was recovered as a white crystalline solid.

Similarly, when N-propenyl-p-aminophenol, N-phenyl - p - aminophenol and N - cyclohexyl - p - aminophenol are treated with phenylisocyanate in accordance with the preceding example, N-phenyl-N'-propenyl-, N,N'-diphenyl-, and N-phenyl-N'-cyclohexyl - N' - (p - hydroxyphenyl) - urea are obtained respectively.

EXAMPLE IV

*N-phenyl-N'-n-butyl - N'-(p-hydroxyphenyl)-urea.*—In a process similar to Example I, 100 parts of phenylisocyanate was treated with 137 parts of N-butyl-p-aminophenol to produce N-phenyl-N'-n-butyl-N'(p-hydroxyphenyl)urea having a melting point of 158° C.

EXAMPLE V

*N-phenyl-N'-(3-methyl - 4 - hydroxylphenyl) - urea.*—In a process similar to Example I, phenylisocyanate was treated with 3-methyl-4-hydroxyaniline to produce N-phenyl-N'-(3-methyl-4-hydroxyphenyl) urea.

EXAMPLE VI

*N-phenyl-N'(2-pentadecyl-4-hydroxyphenyl) - urea.*—In a process similar to Example I, phenylisocyanate was treated with 2-pentadecyl-4-hydroxaniline to produce N-phenyl-N'-(2-pentadecyl-4-hydroxyphenyl)urea. Similarly, when 2-benzyl-, 3-cyclohexyl-, 3-vinyl- and 2-benzyl-4-hydroxyaniline are treated with phenylisocyanate according to the procedure of Example VI, we obtain N-phenyl-N'-(2-benzyl-4-hydroxyphenyl)-urea, N-phenyl-N'-(3 - cyclohexyl - 4 - hydroxyphenyl)urea, N-phenyl-N'-(3-vinyl-4-hydroxyphenyl)urea.

To illustrate specific examples of that embodiment of our invention wherein two hydrocarbon groups are substituted in the general formula of our compounds, when we treat, as described in Example I, p-tolylisocyanate with 3-octyl-4-hydroxaniline, o-tolylisocyanate with N-methyl-p-aminophenol, and phenylisocyanate with N-methyl-2-vinyl-4-hydroxyaniline we obtain N-(p-tolyl)-N'-(3-octyl-4-hydroxyphenyl)urea, N-(o-tolyl)-N'-methyl-N'-(p- hydroxyphenyl)urea, and N-phenyl-N'-methyl-N'-(2-vinyl-4-hydroxyphenyl)urea.

Furthermore, we can provide N-aryl-N'-(p-hydroxyphenyl)ureas wherein each of the nitrogen, aryl and phenyl radicals contain hydrocarbon substituents. Thus, upon treating o-ethylphenylisocyanate, m-tolylisocyanate and p-cyclohexylphenylisocyanate with N-methyl-2-phenyl-4-hydroxyaniline, N-ethyl-3-pentadecyl-4-hydroxyaniline, and N-cyclohexyl-2-methyl-4-hydroxyaniline, we obtain N-(2-ethylphenyl)-N'-methyl- N' - (2 - phenyl - 4 - hydroxyphenyl)urea, N - (3-methylphenyl) - N'-ethyl-N'-3-pentadecyl-4-hydroxyphenyl)urea and N-(4-cyclohexylphenyl)-N' - cyclohexyl-N'-(2-methyl-4-hydroxyphenyl)-urea, respectively.

The compounds of our invention are excellent antioxidants and we have illustrated this property in Table I, wherein we have listed the results obtained by determining the oxidation stability of gasoline according to the induction period method, ASTM designation: D525-46, as fully described in Part III-A, ASTM Standards for 1946. We have employed gasoline in this determination since it is representative of an important class of industrial products which are susceptible to deterioration, and for which it is important to provide stabilizing materials. The column headed IPI lists the induction period increase, in minutes, over that of the gasoline in the absence of the antioxidants of our invention. That is, under the conditions of test, each gasoline exhibits a period, typical of the gasoline, wherein oxygen is not absorbed. In the presence of our inhibitors this period is increased by the amount listed under IPI. The lack of effectiveness of N-(p-hydroxyphenyl) urea is shown by compound No. 8 in the Table.

*Table I*

EFFECT ON INDUCTION PERIOD INCREASE OF GASOLINE

| No. | Additive | IPI, Min. |
|---|---|---|
| 1 | N-Phenyl-N'-(3-methyl-4-hydroxyphenyl) urea | 275 |
| 2 | N-Phenyl-N'-methyl-N'(p-hydroxyphenyl) urea | 225 |
| 3 | N-(p-tolyl)-N'-(p-hydroxyphenyl) urea | 170 |
| 4 | N-Phenyl-N'-n-butyl-N'-(p-hydroxyphenyl) urea | 110 |
| 5 | N-Phenyl-N'-(2-pentadecyl-4-hydroxyphenyl) urea | 110 |
| 6 | N-(α-Naphthyl)-N'-(p-hydroxyphenyl) urea | 50 |
| 7 | N-(β-Naphthyl)-N'-(p-hydroxyphenyl) urea | 45 |
| 8 | N-(p-hydroxyphenyl) urea | 25 |

To illustrate the improved solubility characteristics of the N-aryl-N'-hydroxyphenyl ureas of our invention, we have listed in Table II the solubility, expressed as milligrams of compound per 100 millimeters of solvent, of representative members of our compounds in isoctane, representative of a petroleum product, and have contrasted therein the solubility of the N-phenyl-N'-p-hydroxyphenyl urea unsubstituted with hydrocarbon groups. It is evident that we can obtain more than a four-and-one-half-fold increase in the solubility of the N-acryl-N'-hydroxyphenyl urea by merely substituting one methyl group thereon.

*Table II*

HYDROCARBON SOLUBILITY OF N-ARYL-N'-(HYDROXYPHENYL) UREAS

| No. | Material | Solubility, mg./100 ml. |
|---|---|---|
| 1 | N-Phenyl-N'-methyl-N'-(p-hydroxyphenyl)urea | 21.2 |
| 2 | N-Phenyl-N'-(2-pentadecyl-4-hydroxyphenyl) urea | 10.2 |
| 3 | N-Phenyl-N'-(p-hydroxyphenyl) urea | 4.6 |

This invention is further disclosed in applicants' co-pending application Serial No. 200,115.

We have disclosed a number of embodiments of our invention and illustrated several methods whereby these materials can be prepared. However, our invention is not intended to be limited to the specific examples herein or to the means decribed herein for obtaining our novel compounds.

We claim:

1. A fuel composition stable to oxidation consisting essentially of a liquid petroleum hydrocarbon fuel of the gasoline type normally susceptible to deterioration in the presence of oxygen and, in quantity sufficient to inhibit such deterioration, an N-aryl-N'-(p-hydroxyphenyl) urea antioxidant ingredient having the structure

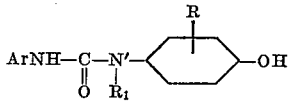

wherein R is a hydrocarbon radical selected from the group consisting of alkyl, cycloalkyl, aralykyl and alkenyl hydrocarbon groups containing from 1 to about 12 carbon atoms, $R_1$ is selected from the group consisting of hydrogen and R, and wherein Ar is an aryl hydrocarbon radical.

2. The composition of claim 1 wherein said N-aryl-N'-(p-hydroxyphenyl) urea is N-phenyl-N'-(3-methyl-4-hydroxyphenyl) urea.

3. The composition of claim 1 wherein said N-aryl-N'-(p-hydroxyphenyl) urea is N-phenyl-N'-(2-pentadecyl-4-hydroxyphenyl) urea.

References Cited in the file of this patent

UNITED STATES PATENTS

| Number | Name | Date |
|---|---|---|
| 2,195,167 | Edgerton | Mar. 26, 1940 |
| 2,266,601 | Howland | Dec. 16, 1941 |
| 2,373,372 | Banks | Apr. 10, 1945 |
| 2,477,872 | Haury | Aug. 2, 1949 |
| 2,657,984 | Braithwaite | Nov. 3, 1953 |